United States Patent [19]

Edwards et al.

[11] Patent Number: 4,604,024
[45] Date of Patent: Aug. 5, 1986

[54] WASHER PICK UP AND PLACEMENT TOOL

[75] Inventors: David K. Edwards, Eaton; John H. Kramer, Miamisburg, both of Ohio

[73] Assignee: General Motors Corporation, Detroit, Mich.

[21] Appl. No.: 674,690

[22] Filed: Nov. 26, 1984

[51] Int. Cl.⁴ .............................................. B65G 47/90
[52] U.S. Cl. ................................. 414/592; 294/1.1; 414/676; 414/69; 414/125; 414/222; 414/618; 414/626; 414/680; 414/908; 414/787; 414/744 R; 414/749; 901/30; 901/50
[58] Field of Search ................ 414/675, 676, 125, 69, 414/28, 29, 71, 116, 120, 128, 416, 680, 618, 626, 729, 730, 222, 225, 787, 731, 732, 733, 738, 744 A, 751, 908, 78; 901/30, 50; 29/732; 294/64.2, 64.3, 1.1; 271/97, 195

[56] References Cited

U.S. PATENT DOCUMENTS

| 1,486,818 | 3/1924 | Whitehead | 414/908 X |
| 2,152,591 | 3/1939 | Hanneman. | |
| 3,261,481 | 7/1966 | Laverty | 414/618 |
| 3,523,706 | 8/1970 | Logue | 294/64.3 |
| 3,527,368 | 9/1970 | Bambara | 414/676 X |
| 4,029,351 | 6/1977 | Apgar et al. | 294/64.3 |
| 4,079,512 | 3/1978 | Lakes | 414/120 X |
| 4,314,524 | 2/1982 | Deguchi | 901/30 X |
| 4,502,721 | 3/1985 | Savin-Czeizler et al. | 294/1.1 |

FOREIGN PATENT DOCUMENTS 2345371 3/1976 France ............................... 414/676

OTHER PUBLICATIONS

IBM Technical Disclosure Bulletin-vol. 22, No. 8A, Jan. 1980-pp. 3370 & 3371.

Primary Examiner—Frank E. Werner
Attorney, Agent, or Firm—Edward J. Biskup

[57] ABSTRACT

A tool for picking up and releasing washers which uses a retractable rod member that is insertable into the washer and directs jets of pressurized air alternately onto the bottom surface of the washer to cause the latter to be picked up and onto the top surface of the washer to cause the latter to be released.

3 Claims, 4 Drawing Figures

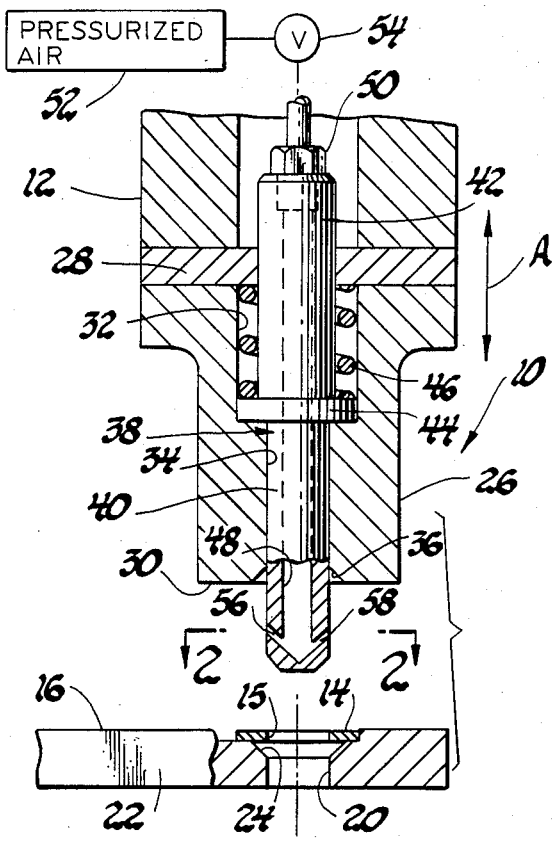

WASHER PICK UP AND PLACEMENT TOOL

This invention relates to work tools and more particularly concerns a tool that serves to pick up a washer and place it on a shaft during an assembly operation.

More specifically, the washer pick-up and placement tool, according to the present invention, is adapted to be connected to the arm of a manipulator, such as a robot, which serves to move the tool from a feed track where it picks up a washer and carries the washer to another location for placement onto a shaft. In the preferred form, the tool comprises a housing having a free end and an opposed end the latter of which is adapted to be fixed to the arm of the manipulator. The housing is formed with a bore that extends through the housing and terminates at the free end thereof where a pair of tapered surfaces are formed on opposite sides of the bore. A rod member is mounted in the bore for sliding movement relative thereto and has a portion that extends out of the free end of the housing. A passage is provided in the rod member along the longitudinal axis thereof and a source of pressurized air is connected to one end of the passage. The other end of the passage is connected to a pair of nozzles which are located in the portion of the rod member that extends out of the free end of the housing. The nozzles are angled so as to direct the pressurized air in the form of a pair of air jets towards the free end of the housing. In addition, spring means are provided which are operatively connected to the rod member and bias the latter towards an extended position relative to the housing to allow the nozzles in the rod member to be inserted into the hole in the washer and cause the air jets to act on the bottom surface of the washer to lift the washer and slide it onto the rod member and be held thereon. The spring means also allow the rod member to be retracted into the housing when the rod member is pressed against the shaft. In the retracted position, the nozzles are moved close to the free end of the housing and cause the air flow emanating from the nozzles to impinge upon the tapered surfaces on the housing and be redirected towards the top surface of the the washer to release it from the rod member and place it onto the shaft.

The objects of the present invention are to provide a new and improved tool for handling washers that uses air pressure to pick up and to release the washer from the tool; to provide a new and improved tool for handling washers that is characterized in that a slidable rod member is provided within a housing that is insertable into a washer and relies on jets of air to raise and hold the washer on the rod member while the latter is moved to a location for depositing the washer on a shaft; to provide a new and improved tool for handling washers that uses jets of air which are directed against the bottom surface of a washer for raising the latter onto a support rod and which cause the washer to be released from the support rod when the latter is repositioned so as to cause the jets of air to impinge upon the top surface of the washer; and to provide a new and improved tool for picking up and releasing washers which uses a retractable rod member that is insertable into the washer and that directs jets of pressurized air alternately onto the bottom surface of the washer and onto the top surface of the washer for causing the latter to be picked up and released.

The above and other objects of the present invention will be more apparent from the following detailed description when taken in conjunction with the accompanying drawings, in which;

FIG. 1 is an elevational view showing a tool partially in section and made according to the present invention for picking up and releasing washers;

FIG. 2 is an enlarged sectional view taken on line 2—2 of FIG. 1 showing the two air nozzles formed in the movable rod member of the tool;

FIG. 3 is a view of the tool shown in FIGS. 1 and 2 positioned with the rod member located in the washer for causing the air flow from the nozzles to raise the washer onto the rod member; and FIG. 4 is a view of the tool of FIGS. 1 and 2 showing the rod member of the tool retracted so as to cause the air flow from the nozzles to reverse direction and release the washer from the rod member.

Referring now to the drawings, and more particularly FIGS. 1 and 2 thereof, a tool 10 made according to the present invention is shown rigidly connected to an arm 12 of a manipulator such as a robot. The manipulator serves to move the tool 10 in a vertical up and down direction as represented by the arrow A and also horizontally to the left or right in order to achieve the desired positioning of the tool 10 for picking up a washer 14 from a feeder device 16 followed by the placement of the washer 14 onto a shaft 18 as seen in FIG. 4. The feeder device 16 serves to preposition washers, such as washer 14, with the circular hole 15 therein concentrically located with respect to a bore 20 formed in a support member 22. The upper part of the bore 20 is formed with a counterbore 24 that is frustum shaped in cross section.

More specifically, the tool 10, according to the present invention, includes a generally cylindrical base housing 26 the upper end of which is rigid with an end cap 28 that is secured to the arm 12 of the manipulator while the lower or free end 30 of the housing terminates with a flat planar surface. A pair of concentric and interconnecting bores 32 and 34 are located in the housing 26 one above the other in vertical alignment. The bore 34 terminates at the free end 30 of the housing 26 with a counterbore 36 that is frustum shaped in cross section. A rod member 38 is located in the aligned bores 32 and 34 and includes a nozzle portion 40 and an air supply portion 42 separated by an annular collar 44. The nozzle portion 40 of the rod member 38 extends into the bore 34 and is supported thereby for relative sliding movement between the position shown in FIG. 1 and the position shown in FIG. 2. In this regard, it will be noted that a coil spring 46 is located in the bore 32 and surrounds the air supply portion 42 of the rod member 38. The lower end of the spring 46 rests on the collar 44 while the upper end is seated against the end cap 28 so that the spring 46 normally maintains the rod member 38 in the extended position seen in FIGS. 1 and 3.

The rod member 38 is provided with a passage 48 of uniform circular cross section which extends from the upper end of the rod member 38 to the lower end thereof. As seen in FIG. 1, a fitting 50 at the upper end of the rod member 38 connects the passage 48 to a source of pressurized air 52 through a conventional on-off valve 54. The lower end of the rod member 38 is formed with a pair of diametrically opposed nozzles 56 and 58 each of which is connected to the passage 48 and serves to direct air flow in the form of an air jet upwardly towards the free end 30 of housing 26 at an angle of approximately 45° relative to the longitudinal center axis of the rod member 38.

In operation and as seen in FIGS. 1 and 2, the feeder device 16 initially positions the washer 14 with the hole 15 thereof concentric relative to and above the bore 20 formed in the support member 22. A command signal is then provided to the manipulator or robot to cause the arm 12 to move into the position shown in FIG. 1, that is, to locate the longitudinal center axis of the rod member 38 in vertical alignment with the center of the bore 20 in the support member 22. During this time the valve 54 is in the open position to cause pressurized air to flow to the passage 48 and be emitted from the nozzles 56 and 58. The arm 12 is then moved downwardly so that the lower end of the rod member 38 extends into the hole 15 in the washer 14 and into the bore 20 in the support member 22 as seen in FIG. 3. In this position, the counterbore 24 provides clearance for the air flow from the nozzles 56 and 58 to impinge upon the bottom surface of the washer 14 and cause the latter to be raised from the support member 22 onto the rod member 38. The arm 12 is then raised vertically and moved to a position directly above the shaft 18 with the longitudinal center axis of the rod member 38 in axial alignment with the longitudinal center axis of the shaft 18 as seen in FIG. 4. This is followed by having the arm 12 move downwardly so as to cause the lower end of the rod member 38 to contact the top of the shaft 18. The downward movement of the arm 12 is continued until the spring 46 is compressed and the rod member 38 is retracted into the base housing 26. When the rod member 38 assumes the position seen in FIG. 4, the air flow from the nozzles 56 and 58 strikes the tapered surfaces of the counterbore 36 in the free end 30 of the housing 26 so that the direction of the jets of air are reversed and impinge upon the top surface of the washer 14. As a result, the washer 14 is released from the rod member 38 and slips onto the shaft 18.

Various changes and modifications can be made in the construction of this tool without departing from the spirit of the invention. Such changes and modifications are contemplated by the inventors and they do not wish to be limited except by the scope of the appended claims.

The embodiments of the invention in which an exclusive property or privilege is claimed are defined as follows.

1. A washer pick-up and placement tool adapted to be connected to an arm of a manipulator and to be moved from a first station where said tool picks up a washer to a second station where said tool places said washer on a shaft, said tool comprising a housing having one end thereof fixed to said arm and having a free end, a bore extending through said housing from said one end to said free end of said housing, a rod member mounted in said bore for relative sliding movement between a first position and a second position and having a portion thereof extending out of said free end of said housing, a passage formed in said rod member, a source of pressurized air connected to said passage, a pair of nozzles connected to said passage and located on opposite sides of said portion of said rod member extending out of said free end of said housing, said nozzles being angled so as to provide air flow in the form of a pair of air jets towards said free end of said housing, and means operatively connected to said rod member for maintaining the latter in said first position when said tool is at said first station so as to permit said nozzles to be inserted into a hole in said washer and cause the air flow emanating from said nozzles to strike the bottom surface of said washer to thereby lift said washer onto the rod member and be held thereon, said means serving to cause said rod member to be located in said second position when said tool is moved to the second station and the rod member is pressed against said shaft so as to locate the rod member relative to the housing whereby the air flow emanating from said nozzles is directed away from said free end of the housing to impinge upon the top surface of said washer and release the washer from the rod member and place it on the shaft.

2. A washer pick-up and placement tool adapted to be connected to an arm of a manipulator for movement from a first station where said tool picks up a washer to a second station where said tool places said washer on a shaft, said tool comprising a housing having one end thereof fixed to said arm and having a free end, a bore extending through said housing from said one end to said free end of said housing, said housing at said free end having a pair of tapered surfaces on opposite sides on said bore, a rod member mounted in said bore for relative sliding movement and having a portion thereof extending out of said free end of said housing, a passage formed in said rod member along a longitudinal axis thereof, a source of pressurized air, one end of said passage connected to said source of pressurized air, a pair of nozzles connected to said passage and located on opposite sides of said portion of said rod member extending out of said free end of said housing, said nozzles being angled so as to provide air flow in the form of a pair of air jets towards said free end of said housing, and spring means operatively connected to said rod member for maintaining the latter in an extended position when said arm is at said first station so as to allow said pair of nozzles to be inserted into a hole in said washer and cause the air flow emanating from said nozzles to impinge upon the bottom surface of said washer to lift said washer onto the rod member an be held thereon, said spring means located in said housing and serving to cause said rod member to be located in a retracted position when said arm is moved to the second station and the rod member is pressed against said shaft so as to cause the rod member to slide into the housing with the result that the air flow emanating from said nozzles impinges upon the tapered surfaces on the opposite sides of said bore and is directed away from said free end of the housing and onto the top surface of said washer to release said washer from the rod member and place it on the shaft.

3. A washer pick-up and placement tool adapted to be connected to an arm of a manipulator for movement from a first station where said tool picks up a washer to a second station where said tool places said washer on a shaft, said tool comprising a housing having one end thereof fixed to said arm and having a free end, a stepped bore extending through said housing from said one end to said free end of said housing, said housing at said free end terminating with a frusto-conical counterbore which provides a pair of tapered surfaces on opposite sides on said bore, a rod member comprising a nozzle portion and an air supply portion separated by a collar mounted in said stepped bore for relative sliding movement and having said nozzle portion extending out of said free end of said housing, a passage formed in said rod member along a longitudinal axis thereof, a source of pressurized air, said passage located in said air supply portion of said rod member and being connected to said source of pressurized air, a pair of nozzles located in said nozzle portion of said rod member and being connected to said passage, said nozzles being located on opposite sides of said nozzle portion of said rod member and being angled so as to provide air flow in the form of a pair of air jets towards said free end of said housing, and a coil spring located in said stepped bore of said housing and being operatively connected to said rod member for maintaining the latter in an extended position when said arm is at said first station so as to allow said pair of nozzles to be inserted into a hole in said washer and cause the air flow emanating from said nozzles to impinge upon the bottom surface of said washer to lift said washer onto the rod member and be held thereon, said coil spring serving to cause said rod member to be located in a retracted position when said arm is moved to the second station and the rod member is pressed against said shaft so as to cause the rod member to slide into the housing with the result that the air flow emanating from said nozzles impinges upon the tapered surfaces on the opposite sides of said bore and is directed away from said free end of the housing and onto the top surface of said washer to release said washer from the rod member and place it on the shaft.

* * * * *